(12) United States Patent
Mizell

(10) Patent No.: US 7,072,368 B2
(45) Date of Patent: Jul. 4, 2006

(54) OPTICAL CONTACTING METHOD AND APPARATUS

(75) Inventor: Gregory J Mizell, Tarpon Springs, FL (US)

(73) Assignee: II-VI Incorporated, Saxonburg, PA (US)

( * ) Notice: Subject to any disclaimer, the term of this patent is extended or adjusted under 35 U.S.C. 154(b) by 0 days.

(21) Appl. No.: 10/861,070

(22) Filed: Jun. 4, 2004

(65) Prior Publication Data

US 2004/0218641 A1  Nov. 4, 2004

Related U.S. Application Data

(63) Continuation of application No. 09/979,955, filed as application No. PCT/US00/14635 on May 26, 2000, now abandoned.

(60) Provisional application No. 60/136,108, filed on May 26, 1999.

(51) Int. Cl.
H01S 3/10 (2006.01)
(52) U.S. Cl. ..................................................... 372/21
(58) Field of Classification Search ................ None
See application file for complete search history.

(56) References Cited

U.S. PATENT DOCUMENTS

| | | | |
|---|---|---|---|
| 4,165,469 A | 8/1979 | Ammann | |
| 4,408,832 A * | 10/1983 | Hartman et al. | 359/846 |
| 4,797,893 A * | 1/1989 | Dixon | 372/66 |
| 4,847,851 A * | 7/1989 | Dixon | 372/75 |
| 4,872,177 A * | 10/1989 | Baer et al. | 372/75 |
| 5,365,539 A | 11/1994 | Mooradian | |
| 5,402,437 A * | 3/1995 | Mooradian | 372/92 |
| 5,408,313 A | 4/1995 | Ponstingl et al. | |
| 5,508,490 A * | 4/1996 | Klose | 219/121.62 |
| 5,521,932 A | 5/1996 | Marshall | |
| 5,548,606 A | 8/1996 | Senn et al. | |
| 5,626,424 A * | 5/1997 | Litvin et al. | 374/121 |
| 5,640,407 A * | 6/1997 | Freyman et al. | 372/36 |
| 5,651,023 A | 7/1997 | MacKinnon | |
| 5,684,623 A | 11/1997 | King et al. | |
| 5,796,766 A | 8/1998 | Hargis et al. | |
| 5,802,086 A * | 9/1998 | Hargis et al. | 372/22 |
| 5,838,713 A | 11/1998 | Shimoji | |
| 5,878,073 A * | 3/1999 | Wu | 372/108 |
| 6,101,201 A | 8/2000 | Hargis et al. | |
| 6,243,407 B1 | 6/2001 | Mooradian | |
| 6,270,222 B1 * | 8/2001 | Herpst | 359/511 |
| 6,385,220 B1 | 5/2002 | Miller et al. | |
| 6,404,797 B1 | 6/2002 | Mooradian | |
| 6,501,772 B1 * | 12/2002 | Peterson | 372/10 |

OTHER PUBLICATIONS

Karow, Hank H., "Fabrication Methods for Precision Optics", *Optical Fabrication—Methods and Machines*, pp. 560-563, 1993.

* cited by examiner

Primary Examiner—Minsun Oh Harvey
Assistant Examiner—Phillip Nguyen
(74) Attorney, Agent, or Firm—The Webb Law Firm

(57) ABSTRACT

Disclosed is a method and apparatus for improving the performance of a microlaser. A laser material (110) is optically contacted to a nonlinear material (120), either directly or through an intermediate clear or undoped substrate (115), to form a microlaser assembly. Continuous pressure, either static or variable, is applied to the microlaser assembly in a direction perpendicular to the interface of the elements in the assembly.

29 Claims, 2 Drawing Sheets

OPTICAL CONTACTING METHOD AND APPARATUS

CROSS REFERENCE TO RELATED APPLICATIONS

This application is a continuation of application Ser. No. 09/979,955 filed Nov. 26, 2001, now abandoned which is the national phase of International Application No. PCT/US00/14635 filed May 26, 2000, which designated, inter alia, the United States, and which claims the benefit of U.S. Provisional Application No. 60/136,108, filed May 26, 1999.

BACKGROUND OF THE INVENTION

1. Field of the Invention

This invention relates to miniature lasers and other optical devices that use optical contacting methods to affix polished components to one another.

2. Description of the Prior Art

In many optical applications, it is desirable to rigidly join two polished components into a composite optical assembly. Compound lenses, for example, may consist of two or more elements with different indices of refraction and/or dispersion. In certain cases, adjoining surfaces are polished to the same radius of curvature and joined to each other to form a single unit. Techniques for joining the two materials include a variety of optical cements and epoxies that may be cured with the help of UV radiation or heat and, in some cases, optical contacting.

While adhesives are commonly used for low power applications, they often degrade in the presence of high-powered laser radiation. Optical contacting techniques are free from this problem since the surfaces to be joined are placed in direct contact with one another. These techniques have most commonly been used in the optical shop to rigidly affix two components (typically of the same material) for polishing or other operations. Finished optical components, such as air-gapped etalons and zero-order waveplates, have also been assembled via optical contacting and, in the absence of particulate contamination or temperature gradients, form robust mechanical assemblies.

Optical contacting has also been used for the assembly of miniature laser devices. U.S. Pat. No. 5,651,023 describes an intracavity-frequency doubled laser microlaser device consisting of at least three planar optical components. According to this patent, assembly via optical contacting is a preferred embodiment that leads to low cost, mechanically rugged devices. In addition, advantageous etalon effects can be achieved by using components with dissimilar indices of refraction that produce advantageous frequency selective etalon effects when the optical path length of the individual components is carefully controlled. U.S. Pat. No. 5,796,766 discloses several microlaser devices in which one of the optically contacted intracavity components is used to mount and heat sink the assembly. U.S. Pat. No. 5,838,713 describes a tunable, blue, intracavity-doubled microlaser in which one surface of the nonlinear contacted mounting plate crystal is optically contacted to the gain medium for compactness and ease of assembly.

In these cases where the optically contacted surfaces are placed inside a laser resonator, it is desirable to reduce the optical losses associated with the interface to a level that makes them insignificant with respect to other sources of intracavity loss (coatings, bulk crystal loss, etc.). In intracavity-frequency doubled lasers, for example, the nonlinear conversion efficiency increases superlinearly with intracavity power. Since this power increases rapidly with decreasing loss, it is desirable to reduce the intracavity loss to the lowest possible value. Possible sources of losses at the optically contacted intracavity interface between two materials include scattering, debonding due to differential thermal expansion and inhomogeneities due to localized variations in the optical properties of the bonded surfaces.

Therefore, it would be an advantage to provide an optical contacting method that reduces the optical losses at the interface between the component pieces of an optically contacted microlaser assembly. Ideally, such a method could be used with commonly-employed gain and nonlinear optical materials including neodymium-doped YAG and neodymium-doped yttrium vanadate, chromium-doped lithium strontium aluminum fluoride, potassium titanyl phosphate, beta barium borate and lithium triborate. It would be additionally advantageous if the improved optical contacting technique offered measurable improvements in the losses and/or homogeneity of optically contacted surfaces designed for use outside of a laser resonator.

SUMMARY OF THE INVENTION

Additionally, I have developed an improved optical contacting method and apparatus that yields reduced losses in an intracavity-doubled microlaser. According to the invention, pressure is applied to the assembled microlaser in a direction perpendicular to the interface, reducing the losses. This pressure can be a static pressure, such as from a mechanical means, or can be a variable pressure, such as from a piezoelectric actuator.

In a preferred embodiment, this technique is applied to the manufacture of an intracavity-doubled neodymium-doped yttrium vanadate laser. Alternative embodiments include nonlinear optical crystals with contacted protective windows and other optically contacted assemblies as zero-order waveplates.

DESCRIPTION OF THE PREFERRED EMBODIMENTS

Figure 1:
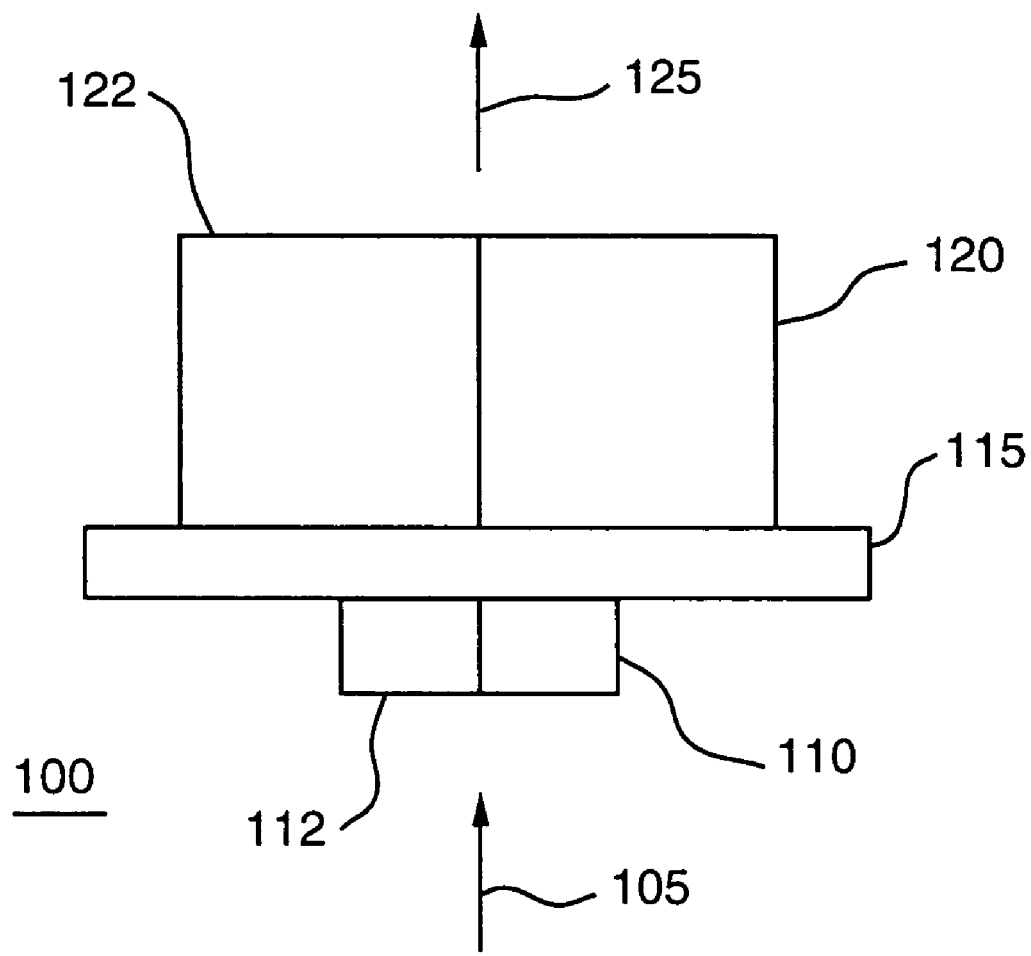
FIG. 1 is a schematic view of an optically contacted microlaser designed to generate the second harmonic output of a diode-pumped Nd:YVO$_4$ laser.
Figure 2:
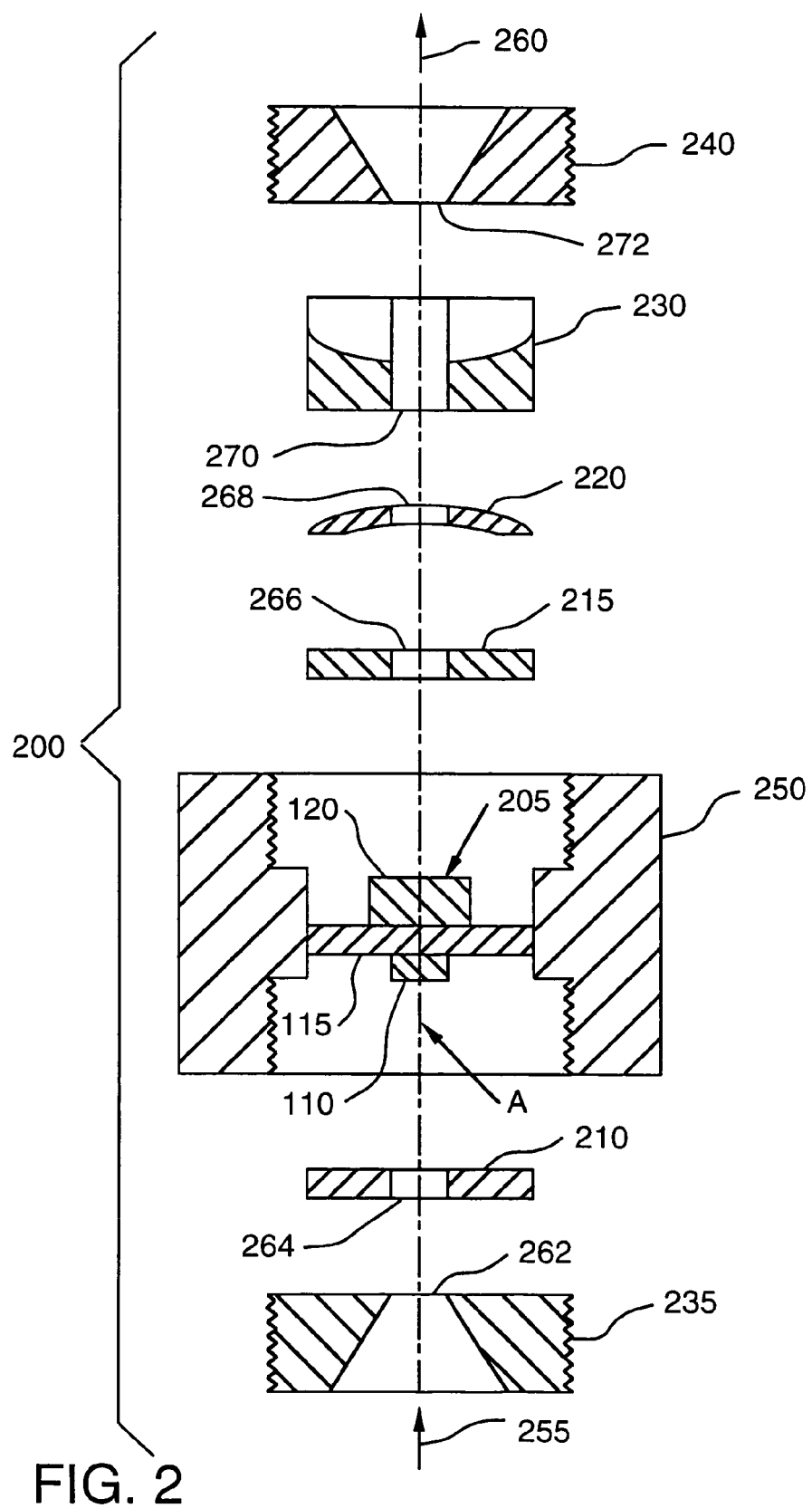
FIG. 2 is an exploded sectional view of a mechanical assembly for applying static pressure to an optically contacted assembly consisting of two or more miniature platelets.

This invention is described in one preferred embodiment with respect to FIGS. 1 and 2. While this embodiment demonstrates perhaps a best mode for achieving this invention's objectives, it may be appreciated by those skilled in the art that there are numerous other methods for achieving its objectives without deviating from the spirit or scope of the invention.

As used in this description, the term "optical contact" or "optical contacting" refers to a joining of two materials through the steps of: (1) polishing the two surfaces so that they are essentially free of scratches and digs (scratch/dig figure of 60/40or less) and have curvatures that are matched to better than 1 fringe over the area of contact; (2) cleaning the surfaces to remove all lint, dust and other contaminants from the surface; (3) placing the two surfaces in physical contact with one another; and (4) applying a light pressure to the two components to force out the air that is trapped between the two parts.

When this process is carried out correctly, the surfaces will be drawn together by van der Waals forces. In the case of identical glass pieces, the force holding the surfaces together is in the range of 29 to 43 psi and a shear force of approximately 114 psi acting parallel to the contacted surface is required to separate them. In the optical shop, glass pieces are usually separated with a sharp blow from a wooden mallet or by applying local heat to one edge of the joint with a Bunsen burner or other heat source. In the latter case, differential expansion across the contacted surface acts to break the bond.

Optical contacting techniques have been used to assemble compact solid state laser devices that are typically pumped by the output of a semiconductor laser diode. Advantages of the contacting technique for the assembly of these devices include ease of manufacture, advantageous etalon effects that can be used to stabilize the frequency spectrum and harmonic output of an intracavity doubled laser (U.S. Pat. No. 5,651,023) and the efficient removal of heat from the gain material (U.S. Pat. No. 5,796,766). Other laser devices that may benefit from the optical contacting assembly method include passively Q-switched microlasers, pump modulated microlasers and a variety of devices where sum frequency generation is used to generate an output that is shorter than the oscillation wavelength of the laser. In all cases, it is advantageous to minimize the linear losses of the assembly that may be due to bulk scattering the optical materials and at the optically contacted interfaces. In addition, it is desirable to minimize the spatial loss variations across the aperture of the assembled device.

In the course of investigations into the properties of optically contacted microlasers, I discovered that the continuous application of static pressure or a variable active pressure to an assembled device produces a significant increase in output power and increases the area of the device over which a constant output power is obtained. Additionally, there is evidence of an improved spatial mode structure, especially at higher input pump powers. In an intracavity-doubled microlaser consisting of optically contacted platelets of Nd:YVO$_4$, undoped YAG and KTP, the application of pressure by means of a common office clamp increased the visible output power of the device by 20%. Similar effects have been observed when pressure was applied to a blue microlaser that used potassium niobate to frequency double the intracavity field.

This result is unexpected and unanticipated in the prior art. Based on preliminary experiments, I believe that the pressure-assisted optical contacting technique can be used to improve the performance of any optically contacted microlaser assembly and, potentially, devices that are designed to operate outside the laser cavity. For example, borate crystals with optically contacted protective windows may perform better in both intracavity and extracavity applications when pressure is applied in accordance with the present invention. The technique may also improve the performance of same-material assemblies, like zero-order waveplates, by reducing the interface losses and/or opposing forces that act to break the van der Waals bonds that hold the two surfaces together.

FIG. 1 is a schematic representation of an intracavity-doubled microlaser 100 consisting of a laser gain crystal 110, such as a 3 mm×3 mm square neodymium doped yttrium-vandate (Nd:YVO$_4$) crystal with a thickness of 0.4 mm, a substrate 115, such as a 9 mm diameter circular undoped or clear yttrium-aluminum-garnet (YAG) disc with a thickness of 0.4 mm, and a nonlinear (second harmonic generation) crystal 120, such as a 3 mm×3 mm square crystal of potassium titanyl phosphate (KTP or KTiOPO$_4$) with a thickness of 1.5 mm. A pump radiation 105 from a laser, such as an 808 nm diode laser, is incident on an input surface 112 of the laser gain crystal 110. A dielectric mirror is applied to this input surface 112 using known techniques to achieve a reflectivity in excess of 99.5% at the 1064 nm laser wavelength and high transmission (>90%) at the pump laser wavelength. The opposite surface of the laser gain crystal 110 is optically contacted to one face of the substrate 115. The inner face of the nonlinear crystal 120 is similarly optically contacted to the opposite face of the substrate 115 and aligned with the laser gain crystal 110. The nonlinear crystal 120 has an output face 122 that is coated for high reflectivity (>99.5%) at the laser wavelength and high transmission (>90%) at the second harmonic wavelength, for example, of 532 nm. An output beam 125, in this example, consists primarily of green second harmonic light with a small component at the laser wavelength.

Other nonlinear materials, such as potassium niobate (KN or KNbO$_3$), can be used in the microlaser assembly 100. Other laser gain materials, such as neodymium doped yttrium-aluminum-garnet (Nd:YAG) can be used in the microlaser assembly 100.

According to the prior art, the components of the intracavity doubled microlaser 100 are held in place by optical contacting, although an adhesive may be applied to the periphery of the joined surfaces to add mechanical stability. The current invention improves the performance of the microlaser 100 by applying pressure along the axis of the assembly. This pressure may be a static pressure generated by various mechanical means known to the art, an example of which is shown in FIG. 2. The pressure may also be a variable pressure generated by a variable pressure mechanism, such as a piezoelectric actuator.

In a mechanical pressure assembly 200 shown in FIG. 2, an optically contacted microlaser 205, similar to that shown in FIG. 1, is held between an indium washer 210 adjacent the laser gain material 110 and a flat washer 215 adjacent the nonlinear material 120. A spring washer 220, such as a Belleville washer, curved disc spring or wave washer, is positioned above the flat washer 215. A stainless steel spherical washer 230 is placed above the spring washer 220. The entire assembly is held together in a hollow body piece 250 by a bottom threaded ring 235 and a top threaded ring 240. The substrate 115 contacts the inside surface of the body piece 250. Variable pressure along the axis A of the microlaser assembly 205 is applied by the combined action of the threaded rings 235 and 240 and the spring washer 220. Pressure may be increased by tightening one or both of the rings 235 and 240 to exert a compression force on the microlaser assembly 205. The indium washer 210 serves the dual purpose of heat removal and positioning of the gain medium. Pump radiation 255 is incident on the microlaser assembly 205 from the bottom of the assembly 205 through axial holes 262 and 264 in the bottom threaded ring 235 and the indium washer 210, respectively. An output beam 260 emerges from the top of the assembly 205 through axial holes 266, 268, 270 and 272 in the flat washer 215, spring washer 220, spherical washer 230 and the top threaded ring 240, respectively.

Other embodiments and modifications of this invention may occur to those of ordinary skill in the art in view of these teachings. For example, pressure may be applied to a four-component assembly designed for the generation of third harmonic radiation through a sequential double-and-sum process. In addition, the technique may be applied to larger component assemblies with non-planar end faces. I also believe the technique may be used to good advantage with nonlinear crystal assemblies having optically contacted end windows and with contacted assemblies of similar materials. Likewise, improved output may be achieved through the use of a variable pressure applied to the device through mechanisms, such as piezoelectric actuators or other embodiments known to those skilled in the art.

Although the present invention has been described in detail in connection with the discussed embodiments, various modifications may be made by one of ordinary skill in the art without departing from the spirit and scope of the present invention. Therefore, the scope of the present invention should be determined by the attached claims.

I claim:

1. An apparatus for use in connection with a microlaser, the apparatus comprising:
   a) a laser gain crystal;
   b) a nonlinear crystal optically contacted to the laser gain crystal and forming an assembly; and
   c) means for applying continuous pressure to the assembly in a direction perpendicular to the interfaces between the elements in the assembly.

2. The apparatus of claim 1 wherein the laser gain crystal is optically contacted to one surface of a clear substrate and the nonlinear crystal is optically contacted to an opposite surface of the clear substrate and aligned with the laser gain crystal.

3. The apparatus of claim 1 wherein the laser gain material is selected from the group consisting of neodymium doped yttrium-vanadate and neodymium doped yttrium-aluminum-garnet and the nonlinear material is selected from the group consisting of potassium niobate and potassium titanyl phosphate.

4. The apparatus of claim 2 wherein the substrate is clear yttrium-aluminum-garnet.

5. The apparatus of claim 1 wherein the means for applying continuous pressure is a mechanical means for applying static pressure to the assembly.

6. The apparatus of claim 5 wherein the mechanical means includes a hollow body, with the assembly positioned within the hollow body and held in place by adjustable retaining means and with spring means on one side of the assembly and applying pressure thereto.

7. The apparatus of claim 6 wherein the adjustable retaining means includes a bottom retaining ring threaded to the body on one side of the assembly and having a light passing hole extending therethrough and a top retaining ring threaded to the body on the other side of the assembly and having a light passing hole therethrough, and with the spring means positioned between and contacting one of the retaining rings and the assembly.

8. The apparatus of claim 7 wherein the spring means is a spring washer having a light passing hole extending therethrough.

9. The apparatus of claim 8 wherein the spring washer is selected from the group consisting of Belleville washers, curved disc springs and wave washers.

10. The apparatus of claim 7 further including an Indium washer located between the laser gain crystal and the adjacent retaining ring and having a light passing hole therethrough.

11. The apparatus of claim 7 further including a flat washer located between the nonlinear crystal and the adjacent retaining ring and having a light passing hole therethrough, with the spring means positioned between the adjacent retaining ring and the flat washer.

12. The apparatus of claim 11 further including a spherical washer having a light passing hole therethrough and positioned between the spring means and the adjacent retaining ring.

13. The apparatus of claim 1 wherein the means for applying a continuous pressure is a variable means for applying a variable pressure to the assembly.

14. The apparatus of claim 13 wherein the variable means is a piezoelectric actuator.

15. A method of forming an apparatus for use in connection with a microlaser, the method comprising the steps of optically contacting a laser gain crystal to a nonlinear crystal to form an assembly and applying continuous pressure to the assembly in a direction perpendicular to the interface between the elements of the assembly.

16. The method of claim 15 further including the steps of optically contacting the laser gain crystal to one surface of a clear substrate and optically contacting the nonlinear crystal to an opposite surface of the substrate and aligned with the laser gain crystal in order to form the assembly to which continuous, static pressure is applied.

17. The method of claim 15 wherein the laser gain material is selected from the group consisting of neodymium doped yttrium-vanadate and neodymium doped yttrium-aluminum-garnet and the nonlinear material is selected from the group consisting of potassium niobate and potassium titanyl phosphate.

18. The method of claim 16 wherein the substrate is clear yttrium-aluminum-garnet.

19. The method of claim 15 wherein the pressure applied to the assembly is a static pressure.

20. The method of claim 19 wherein the static pressure is applied to the assembly by mechanical means.

21. The method of claim 20 wherein the mechanical means includes a hollow body, with the assembly positioned within the hollow body and held in place by adjustable retaining means and with spring means on one side of the assembly and applying pressure thereto.

22. The method of claim 21 wherein the adjustable retaining means includes a bottom retaining ring threaded to the body on one side of the assembly and having a light passing hole extending therethrough and a top retaining ring threaded to the body on the other side of the assembly and having a light assing hole therethrough, and with the spring means positioned between and contacting one of the retaining rings and the assembly.

23. The method of claim 22 wherein the spring means is a spring washer having a light passing hole extending therethrough.

24. The method of claim 23 wherein the spring washer is selected from the group consisting of Belleville washers, curved disc springs and wave washers.

25. The method of claim 22 further including an Indium washer located between the laser gain crystal and the adjacent retaining ring and having a light passing hole therethrough.

26. The method of claim 22 further including a flat washer located between the nonlinear material and the adjacent retaining ring and having a light passing hole therethrough, with the spring means positioned between the adjacent retaining ring and the flat washer.

27. The method of claim 26 further including a spherical washer having a light passing hole therethrough and positioned between the spring means and the adjacent retaining ring.

28. The method of claim 15 wherein the pressure applied to the assembly is a variable pressure.

29. The method of claim 28 wherein the variable pressure is applied to the assembly by a piezoelectric actuator.

* * * * *

UNITED STATES PATENT AND TRADEMARK OFFICE
CERTIFICATE OF CORRECTION

| | | |
|---|---|---|
| PATENT NO. | : 7,072,368 B2 | Page 1 of 1 |
| APPLICATION NO. | : 10/861070 | |
| DATED | : July 4, 2006 | |
| INVENTOR(S) | : Mizell | |

It is certified that error appears in the above-identified patent and that said Letters Patent is hereby corrected as shown below:

Column 6, Line 40, Claim 22, "light assing hole" should read -- light passing hole --

Signed and Sealed this

Twelfth Day of December, 2006

JON W. DUDAS
*Director of the United States Patent and Trademark Office*